United States Patent [19]

Itoh

[11] Patent Number: 5,598,740
[45] Date of Patent: Feb. 4, 1997

[54] AUTOMATIC GEAR SHIFT OPERATING MECHANISM

[75] Inventor: Yasuhiko Itoh, Zama, Japan

[73] Assignee: Nissan Motor Co., Ltd., Yokohama, Japan

[21] Appl. No.: 306,969

[22] Filed: Sep. 16, 1994

[30] Foreign Application Priority Data

Oct. 13, 1993 [JP] Japan .................... 5-256015

[51] Int. Cl.⁶ ............................ F16H 59/04; G05G 9/00
[52] U.S. Cl. .................. 74/475; 74/526; 74/527; 74/538
[58] Field of Search ............................ 74/475, 526, 527, 74/538, 473 R

[56] References Cited

U.S. PATENT DOCUMENTS

| | | | |
|---|---|---|---|
| 3,941,008 | 3/1976 | Cambria | 74/473 R |
| 4,370,897 | 2/1983 | Carlo | 74/475 |
| 5,220,984 | 6/1993 | Ruiter | 74/475 X |
| 5,263,383 | 11/1993 | Meisch et al. | 74/475 |
| 5,277,077 | 1/1994 | Osborn | 74/475 |
| 5,400,673 | 3/1995 | Brock | 74/475 |

OTHER PUBLICATIONS

Service Manual No. 622 (R32–1), Nissan Motor Co., Ltd., May 1989, p. C–37.

Primary Examiner—Rodney H. Bonck
Assistant Examiner—Troy Grabow
Attorney, Agent, or Firm—Foley & Lardner

[57] ABSTRACT

In an automatic gear shift operating mechanism, the foremost cam groove as viewed in the longitudinal direction of a motor vehicle has a side wall on the front side of the motor vehicle, which is formed erectly for preventing overshifting of a roller of a check spring roller.

4 Claims, 5 Drawing Sheets

AUTOMATIC GEAR SHIFT OPERATING MECHANISM

BACKGROUND OF THE INVENTION

The present invention relates to an automatic gear shift operating mechanism having a floor-type shift lever.

Conventionally, the automatic gear shift operating mechanism having a floor-type shift lever comprises generally a shift lever with a base end pivotally supported to a bracket fixed to a floor, and a position plate having a speed changeover portion perforated in which a plurality of speed ranges are established: parking range P, reverse range R, neutral range N, drive range D, and low range L or first and second speeds. For further information, see Service Manual No. 622 (R32-1), page C-37, published in May, 1989 by Nissan Motor Co. Ltd.

With the conventional automatic gear shift operating mechanism, however, when the shift lever is positioned in the parking range P, a driver may unconsciously carry out an operation of the shift lever which results in an increased operating force of a knob button.

It is, therefore, an object of the present invention to provide an automatic gear shift operating mechanism which allows an operation of a knob button always with the same operating force.

SUMMARY OF THE INVENTION

There is provided, according to the present invention, an automatic gear shift operating mechanism for a motor vehicle, the automatic gear shift operating mechanism having a shift lever and a knob button, comprising:

a position pin arranged to the shift lever, said position pin being movable in an axial direction of the shift lever when operating the knob button;

a position plate having a speed changeover portion perforated, said speed changeover portion including a plurality of speed ranges such as a parking range with which said position pin is engaged;

a check cam arranged to said position plate on an outer periphery thereof, said check cam having a plurality of cam grooves which include a foremost cam groove as viewed in a longitudinal direction of the motor vehicle, said foremost cam groove having on a front side of the motor vehicle a side wall formed erectly; and a check spring roller having one end connected to the shift lever and another end with a roller, said roller contacting one of said plurality of cam grooves so as to maintain an engagement of said position pin with one of said plurality of speed ranges of said speed changeover portion of said position plate, wherein when said roller of said check spring roller contacts said foremost cam groove so as to maintain an engagement of said position pin with said parking range of said speed changeover portion of said position plate, said foremost cam groove serves to prevent said roller of said check spring roller from overshifting therefrom in a forward direction of the motor vehicle.

DETAILED DESCRIPTION OF THE INVENTION

Figure 1:
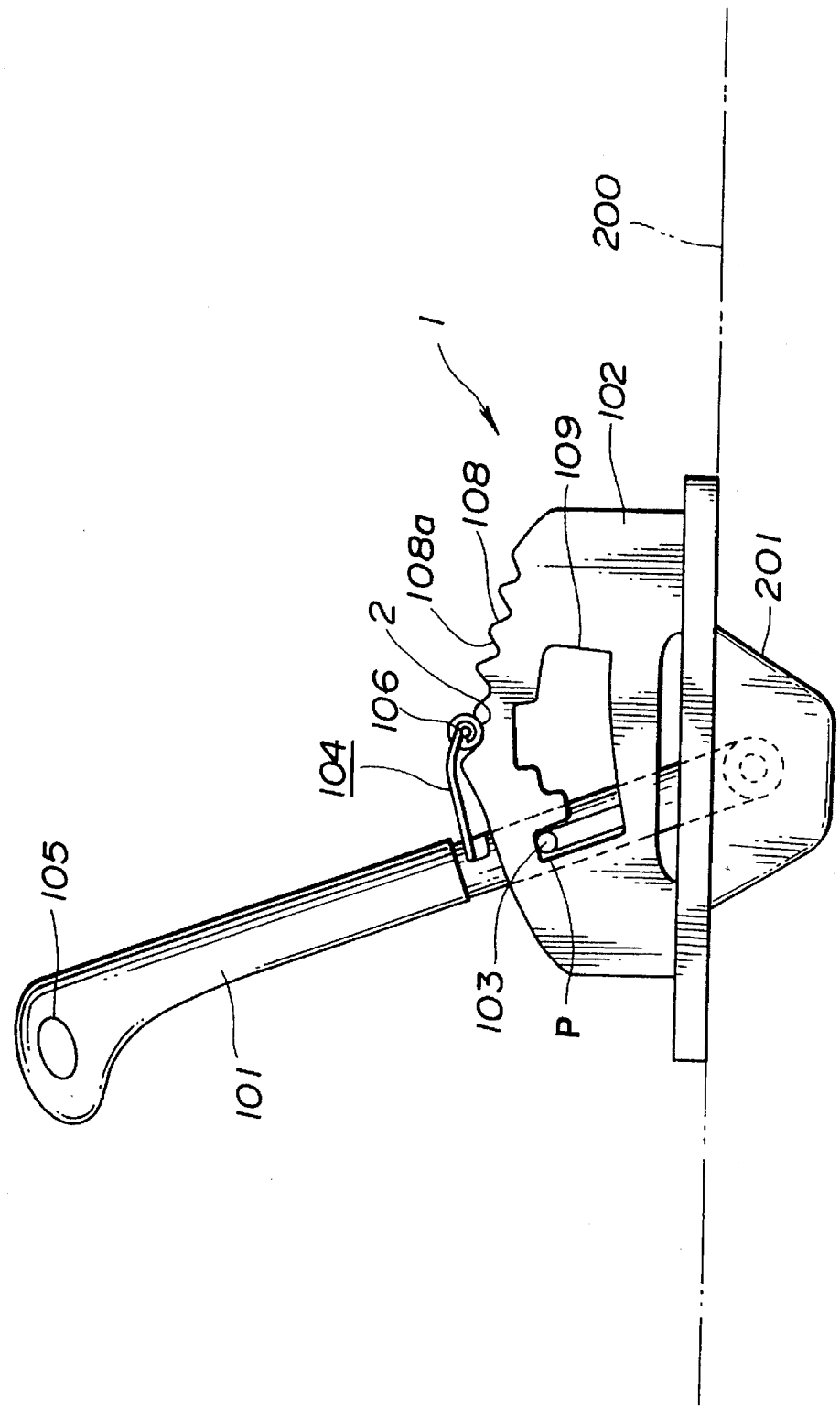
FIG. 1 is a side view showing a preferred embodiment of an automatic gear shift operating mechanism according to the present invention.

Referring to the drawings wherein like reference numerals designate like parts throughout the views, referring first to FIGS. 3–5, before explaining a preferred embodiment of the present invention, a more detailed description will be made with regard to the conventional automatic gear shift operating mechanism.

Figure 3:
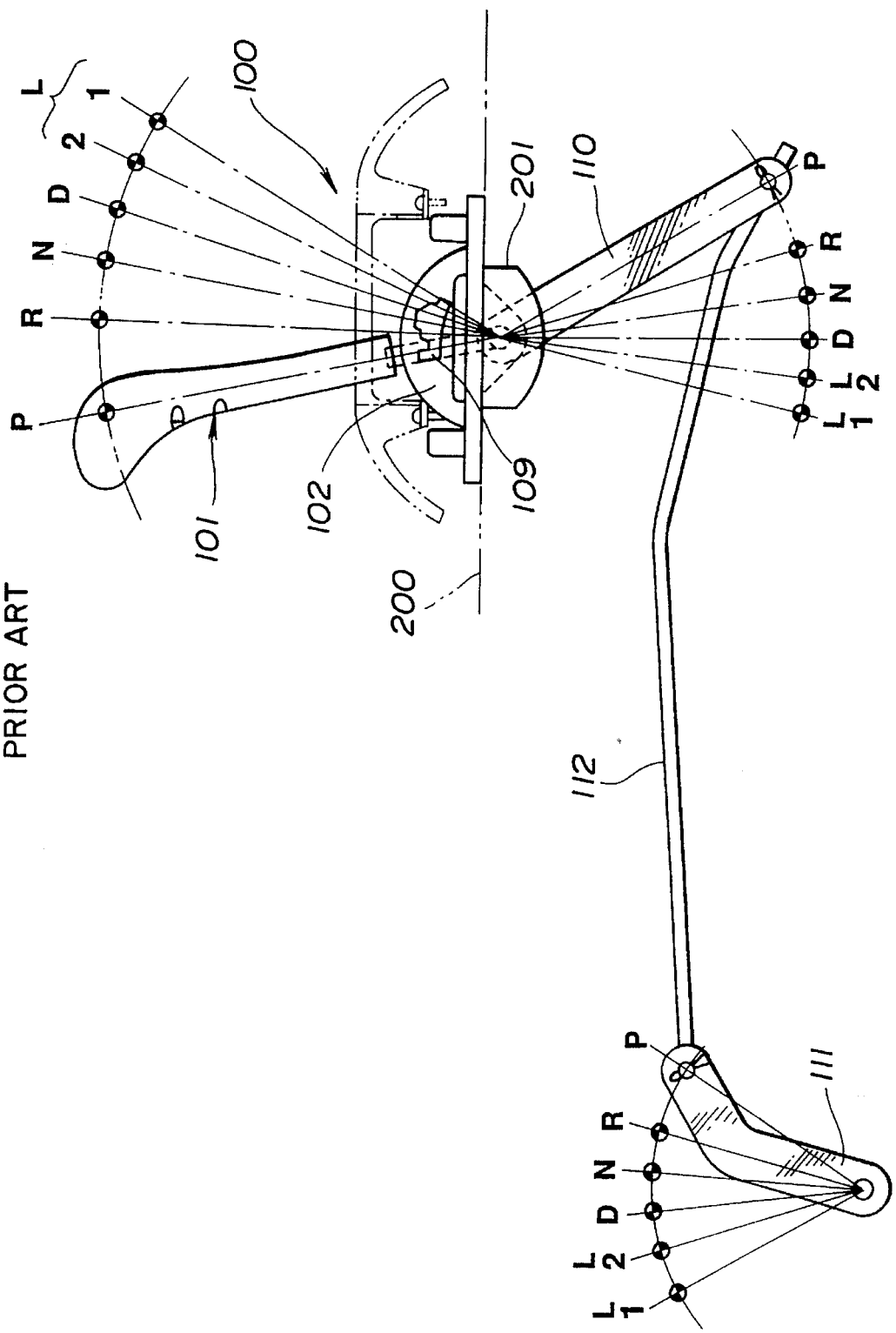
FIG. 3 is a schematic side view showing a conventional automatic gear shift operating mechanism connected to a manual lever.

Referring to FIG. 3, the automatic gear shift operating mechanism, designated by reference numeral 100, is connected to a transmission (not shown) by connecting a swing arm 110 integrally connected to the base end of the shift lever 101 to a manual lever 111 arranged in the transmission through a shift rod 112. The automatic gear shift operating mechanism achieves a desired speed condition by positioning the shift lever 101 in a predetermined speed range.

Figure 4:
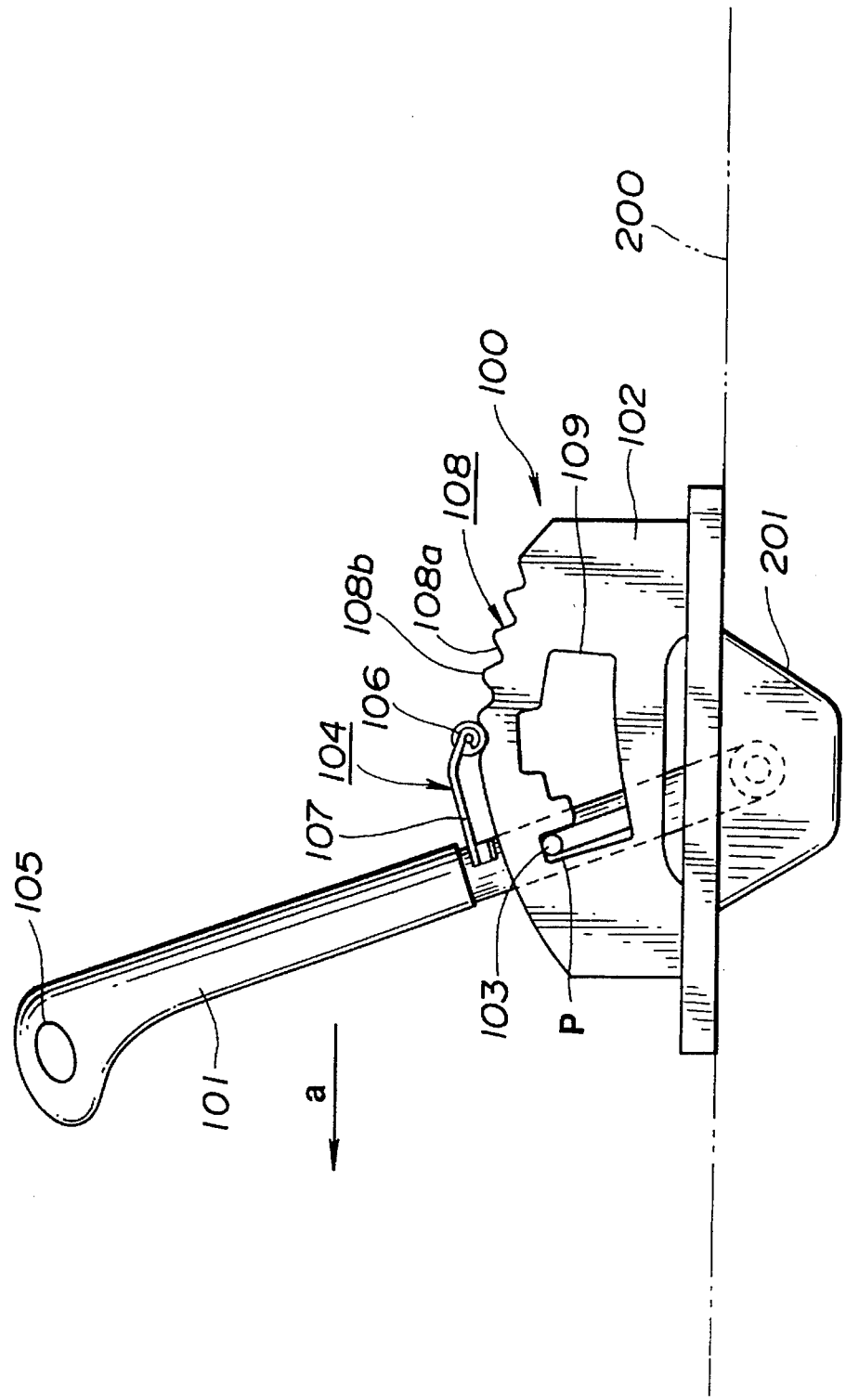
FIG. 4 is a view similar to FIG. 1, showing the conventional automatic gear shift operating mechanism.

Referring to FIG. 4, the automatic gear shift operating mechanism 100 is provided with a position pin 103 for positioning the shift lever 101 in a predetermined speed range, and a check spring roller 104. Referring also to FIG. 5, the position pin 103 is arranged to a compression rod 101a inserted axially slidably in the shift lever 101 so as to extend in the radial direction of the compression rod 101a, and protrude outwardly from an opening 101c of a pipe 101b. The top of the compression rod 101a is connected to the knob button 105, and biased upward by a spring (not shown), the inner pipe 101a being movable downward by pressing the knob button 105. With such movement of the compression rod 101a, the position pin 103 can be moved in the axial direction of the shift lever 101.

Additionally, the check spring roller 104 comprises a spring member 107 having one end connected to the shift lever 101 and another end connected to a roller 106, and is so constructed that the roller 106 is received in one of V-shaped cam grooves 108a of a check cam 108 formed continuously on the outer periphery of the position plate 102 so as to maintain the engaged state of the position pin 103 with one of the speed ranges. Moreover, the check spring roller 104 is so constructed that the roller 106 is moved over a crest 108b of the check cam 108 upon operation of the shift lever 101, resulting in a provision of a sense of moderation to the operation thereof.

With the conventional automatic gear shift operating mechanism 100, when pushing the knob button 105 to operate the shift lever 101 having the position pin 103 positioned in the parking range P as shown in FIG. 4, it often occurs that a driver presses unconsciously the shift lever 101 in the forward direction of the motor vehicle or in the direction of arrow "a" in FIG. 4. At that time, when a pressing load of the shift lever 101 in the direction of arrow "a" is greater, the roller 106 of the check spring roller 104 is moved out of the cam groove 108a, causing an overshifting of the shift lever 101 in the direction of arrow "a". This movement of the shift lever 101 is stopped when the position pin 103 contacts a restraining wall 109a of the speed changeover portion 109 on the front side of the motor vehicle.

Figure 5:
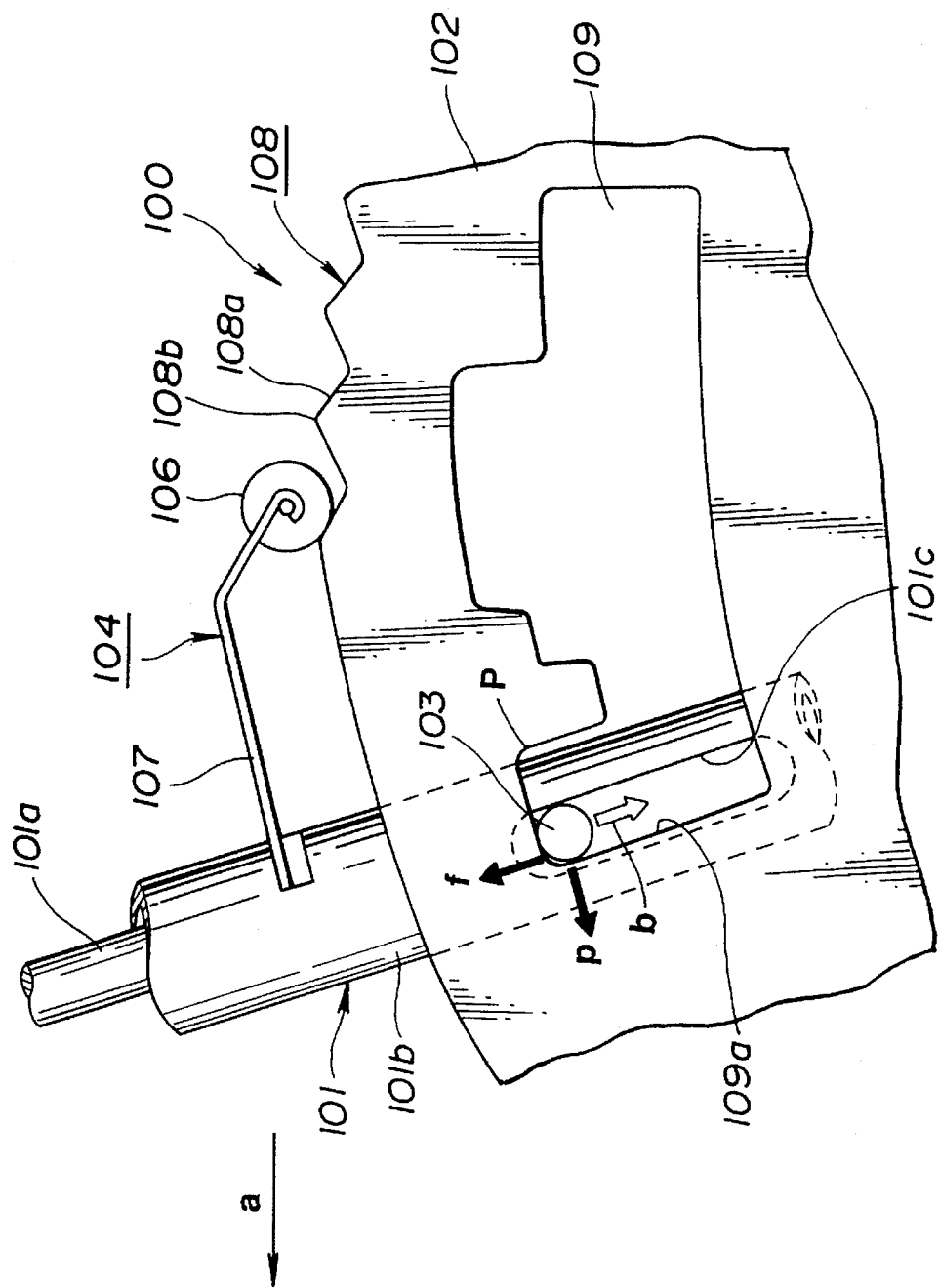
FIG. 5 is a view similar to FIG. 2, but of FIG. 4.

Referring to FIG. 5, when moving the position pin 108 in the direction of arrow "b" in the state that the position pin 108 contacts the restraining wall 109a, it is necessary to apply enough force to overcome a frictional force "f" produced between the position pin 108 and the restraining wall 109a, resulting in an increased operating force of the knob button 105.

This operating force of the knob button 105 tends to increase as it has a greater value. That is, with an increase in the operating force of the knob button 105, a pressing load "p" of the position pin 108 is greater. As the pressing load "p" is greater, the frictional force "f" is increased, resulting in an increase in the operating force of the knob button 105 to be applied to overcome the frictional force "f".

In such a way, with the conventional automatic gear shift operating mechanism 100, when the position pin 103 is positioned in the parking range P, the driver may unconsciously carry out an operation of the shift lever which results in an increased operating force of the knob button 105.

Figure 2:
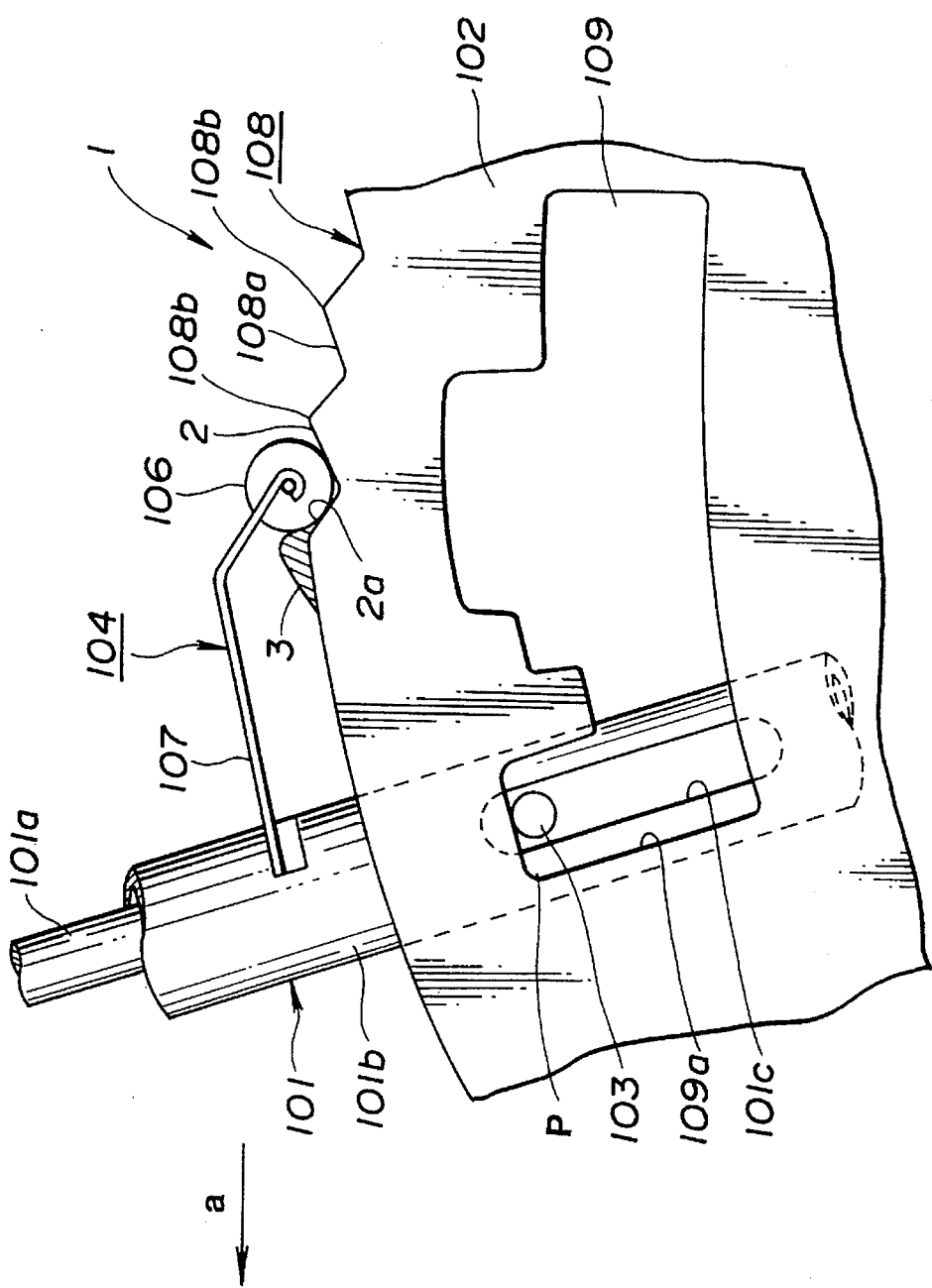
FIG. 2 is an enlarged detail of FIG. 1.

Referring next to FIGS. 1 and 2, a preferred embodiment of an automatic gear shift operating mechanism according to the present invention will be described.

In this embodiment, an automatic gear shift operating mechanism 1 has the same constitution as the conventional automatic gear shift operating mechanism 100 except for the shape of a cam groove 2 for positioning the shift lever 101 positioned in the parking range P as shown in FIG. 1.

Referring to FIG. 1, in the same way as the conventional automatic gear shift operating mechanism 100, the automatic gear shift operating mechanism 1 of the present invention comprises generally the shift lever 101 with a base end pivotally supported to the bracket 201 fixed to the floor 200, and the position plate 102 having the speed changeover portion 109 perforated in which a plurality of speed ranges are established. Moreover, referring also to FIGS. 2, the automatic gear shift operating mechanism 1 is connected to the transmission (not shown) by connecting the swing arm integrally connected to the base end of the shift lever 101 to the manual lever arranged in the transmission through the shift rod. The automatic gear shift operating mechanism 1 achieves a desired speed condition by positioning the shift lever 101 in a predetermined speed range.

With the automatic gear shift operating mechanism 1, the shift lever 101 can be positioned in a predetermined speed range by engaging the position pin 103 with a predetermined speed range of the speed changeover portion 109, and maintaining this engagement by the roller 106 of the check spring roller 104 contacting the check cam 108.

Additionally, a changeover of the speed range of the shift lever 101 can be carried out by releasing the engagement of the position pin 103 with a predetermined speed range through the knob button 105. Specifically, the knob button 105 is operated to move the position pin 103 downward along an axis of the shift lever 101, releasing the engagement of the position pin 10 with a predetermined speed range. With this release maintained, the shift lever 101 is moved in the longitudinal direction of the motor vehicle, then the knob button 105 is released to engage the position pin 103 with a desired speed range, thus allowing a changeover of the shift lever 101 to a desired speed range.

The check spring roller 104 is constructed to be movable together with the shift lever 101, during movement of the shift lever 101, in such a way that the roller 106 is moved over the crest 108b of the check cam 108.

The check cam 108 is constructed to have a plurality of V-shaped cam grooves 108a formed continuously on the outer periphery of the position plate 102 in the longitudinal direction of the motor vehicle. The foremost cam groove 2 of the check cam 108 in the longitudinal direction of the motor vehicle is a cam groove which the roller 106 of the check spring roller 104 contacts when the shift lever 101 is positioned in the parking range P. This foremost cam groove 2 includes a side wall 2a on the front side of the motor vehicle, which is formed erectly, i.e., formed with a projection 3 as shown in FIG. 2 to prevent an overshifting of the roller 106 on the front side of the motor vehicle. The other cam grooves 108a constituting the check cam 108 are cam grooves which the roller 106 of the check spring roller 104 contacts when the shift lever 101 is positioned in the other speed ranges, and formed in the same shape as the prior art.

Referring to FIG. 2, with the check cam 108 as formed in such a way, when operating the shift lever 101 positioned in the parking range P and even if a load acting on the shift lever 101 in the forward direction of the vehicle or in the direction of arrow "a" is applied due to a driver's unconscious operation, the side wall 2a of the cam groove 2 serves to prevent the roller 106 from overshifting from the cam groove 2 in the forward direction of the motor vehicle, thus preventing the shift lever 101 from moving in the forward direction of the motor vehicle.

This prevention of a movement of the shift lever 101 results in a prevention of the contact of the position pin 103 with the restraining wall 109a of the speed changeover portion 109 on the front side of the motor vehicle. As a result, with the automatic gear shift operating mechanism 1, when the shift lever 101 is positioned in the parking range P, no friction is produced between the position pin 103 and the restraining wall 109a, and the knob button 105 can be operated always with the same operating force regardless of a presence and absence of the load applied to the shift lever 101 due to the driver's unconscious operation, resulting in a reduced operating force of the shift lever 101 positioned in the parking range P.

Having described the present invention in connection with the preferred embodiment, it is to be noted that the present invention is not limited thereto, and various modifications and changes are possible without departing the spirit of the present invention. By way of example, in this embodiment, the side wall 2a of the cam groove 2 is formed erectly with the projection 3. Alternatively, the side wall 2a may be an extended part of the position plate 102.

What is claimed is:

1. An automatic gear shift operating mechanism for a motor vehicle, the automatic gear shift operating mechanism having a shift lever and a knob button, comprising:

a position pin arranged to the shift lever, said position pin being movable in an axial direction of the shift lever when operating the knob button;

a position plate having a speed changeover portion perforated, said speed changeover portion including a plurality of speed ranges, including a parking range, with which said position pin is engaged;

a check cam arranged to said position plate on an outer periphery thereof, said check cam having a plurality of cam grooves which include a foremost cam groove as viewed in a longitudinal direction of the motor vehicle, wherein said foremost cam groove is defined by a first surface and a second surface, said second surface being forward of said first surface as viewed in said longitudinal directional of the motor vehicle, said second surface defining a first slope;

a check spring roller having one end connected to the shift lever and another end with a roller, said roller contacting one of said plurality of cam grooves so as to maintain an engagement of said position pin with one of said plurality of speed ranges of said speed changeover portion of said position plate; and means for preventing said roller of said check spring roller from overshifting therefrom in a forward direction of the motor vehicle, said preventing means including a projection extending from said second surface, said projection forming a third surface extending from said second surface, said third surface defining a second slope, wherein said second slope is greater than said first slope, wherein said roller of said check spring roller contacts said foremost cam groove so as to maintain an engagement of said position pin with said parking range of said speed changeover portion of said position plate.

2. An automatic gear shift operating mechanism as claimed in claim 1, wherein said side wall of said foremost cam groove is a part of said position plate.

3. An automatic gear shift operating mechanism for a motor vehicle comprising:

a shift lever having a knob button;

a position pin arranged to the shift lever, said position pin being movable in an axial direction of the shift lever when operating the knob button;

a position plate having a speed changeover portion which engages said position pin, said speed changeover portion having a plurality of speed ranges including a parking range;

a check cam arranged to said position plate on an outer periphery thereof, said check cam having a plurality of cam grooves including a foremost cam groove as viewed in a longitudinal direction of the motor vehicle, wherein said foremost cam groove is defined by a first surface and a second surface, said second surface being forward of said first surface as viewed in said longitudinal directional of the motor vehicle, said second surface defining a first slope, wherein a projection extends from said second surface, said projection forming a third surface extending from said second surface, said third surface defining a second slope, wherein said second slope is greater than said first slope; and a check spring roller having one end connected to the shift lever and another end with a roller, said roller contacting one of said plurality of cam grooves so as to maintain an engagement of said position pin with one of said plurality of speed ranges of said speed changeover portion of said position plate, wherein when said roller of said check spring roller contacts said foremost cam groove so as to maintain an engagement of said position pin with said parking range of said speed changeover portion of said position plate, said foremost cam groove prevents said roller of said check spring roller from overshifting therefrom in a forward direction of the motor vehicle.

4. An automatic gear shift operating mechanism for a motor vehicle comprising:

a shift lever having a knob button;

a position pin arranged to the shift lever, said position pin being movable in an axial direction of the shift lever when operating the knob button;

a position plate having a speed changeover portion which engages said position pin, said speed changeover portion having a plurality of speed ranges including a parking range;

a check cam arranged to said position plate on an outer periphery thereof, said check cam having a plurality of cam grooves including a foremost cam groove as viewed in a longitudinal direction of the motor vehicle, wherein said foremost cam groove is defined by a first surface and a second surface, said second surface being forward of said first surface as viewed in said longitudinal directional of the motor vehicles said second surface defining a first slope;

a check spring roller having one end connected to the shift lever and another end with a roller, said roller contacting one of said plurality of cam grooves so as to maintain an engagement of said position pin with one of said plurality of speed ranges of said speed changeover portion of said position plate; and means for preventing said position pin from contacting a restraining wall of said speed changeover portion of said position plate, said means including a projection extending from said second surface, said projection forming a third surface extending from said second surface, said third surface defining a second slope, wherein said second slope is greater than said first slope, whereby said knob button can be operated with a consistent operating force.

* * * * *